(12) United States Patent
Plocher et al.

(10) Patent No.: US 9,223,840 B2
(45) Date of Patent: Dec. 29, 2015

(54) FAST OBJECT FINGERPRINTS

(71) Applicant: FutureWei Technologies, Inc., Plano, TX (US)

(72) Inventors: John Plocher, San Jose, CA (US); Xitao Zheng, Shenzhen (CN); James Hughes, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 192 days.

(21) Appl. No.: 13/731,881

(22) Filed: Dec. 31, 2012

(65) Prior Publication Data

US 2014/0188813 A1    Jul. 3, 2014

(51) Int. Cl.
*G06F 17/30* (2006.01)

(52) U.S. Cl.
CPC ...... *G06F 17/30557* (2013.01); *G06F 17/3033* (2013.01)

(58) Field of Classification Search
None
See application file for complete search history.

(56) References Cited

U.S. PATENT DOCUMENTS

| | | | |
|---|---|---|---|
| 4,309,569 A * | 1/1982 | Merkle | 713/177 |
| 8,050,251 B2 | 11/2011 | Ongole et al. | |
| 8,051,252 B2 | 11/2011 | Williams | |
| 8,055,618 B2 | 11/2011 | Anglin | |
| 8,060,715 B2 | 11/2011 | Cremelie et al. | |
| 8,074,043 B1 | 12/2011 | Zeis | |
| 8,074,049 B2 | 12/2011 | Gelson et al. | |
| 8,086,799 B2 | 12/2011 | Mondal et al. | |
| 8,849,767 B1 * | 9/2014 | Zheng et al. | 707/664 |
| 2002/0023220 A1 * | 2/2002 | Kaplan | 713/176 |
| 2007/0260476 A1 * | 11/2007 | Smolen et al. | 705/1 |
| 2010/0094907 A1 * | 4/2010 | Cohen et al. | 707/797 |
| 2010/0332751 A1 * | 12/2010 | Quigley et al. | 711/114 |
| 2011/0213917 A1 | 9/2011 | Davis | |
| 2011/0218972 A1 | 9/2011 | Tofano | |
| 2011/0225385 A1 | 9/2011 | Tofano | |
| 2011/0238635 A1 | 9/2011 | Leppard | |
| 2011/0258374 A1 | 10/2011 | Pertocelli | |
| 2011/0258398 A1 | 10/2011 | Saliba et al. | |
| 2011/0258404 A1 | 10/2011 | Arakawa et al. | |
| 2011/0270800 A1 | 11/2011 | Chou et al. | |
| 2011/0270809 A1 | 11/2011 | Dinkar et al. | |
| 2011/0270810 A1 | 11/2011 | Dinkar et al. | |
| 2011/0276543 A1 | 11/2011 | Matze et al. | |
| 2011/0276744 A1 | 11/2011 | Sengupta et al. | |
| 2011/0276781 A1 | 11/2011 | Sengupta et al. | |
| 2011/0289281 A1 | 11/2011 | Spackman | |

(Continued)

OTHER PUBLICATIONS

Reference Model for an Open Archival Information System (OAIS) Aug. 2009, CCSDS 650.0-P-1.1, 131 pages.*
intel ISA Bus Specification and Application Notes Sep. 12, 1989, Intel Corp, Rev 2.01, 73 pages.*

*Primary Examiner* — Jason Liao
(74) *Attorney, Agent, or Firm* — Slater & Matsil, L.L.P.

(57) ABSTRACT

An embodiment computing device operating in a data storage system includes an object storage controller operable to divide an object into blocks and to create an object hash from hash values, and a network interface in communication with the object storage controller, the network interface operable to transmit the blocks to a storage subsystem that generates one of the hash values from each of the blocks, to receive the hash values from the storage subsystem, and to provide the hash values to the object storage controller for creation of the object hash from the hash values. In an embodiment, the object storage controller is operably coupled to a processor and a memory or stored on a computer readable medium.

20 Claims, 1 Drawing Sheet

(56) References Cited

U.S. PATENT DOCUMENTS

| | | |
|---|---|---|
| 2011/0289290 A1 | 11/2011 | Akirav et al. |
| 2011/0307447 A1 | 12/2011 | Sabaa et al. |
| 2011/0320865 A1 | 12/2011 | Jain et al. |
| 2013/0138620 A1* | 5/2013 | Yakushev et al. ............ 707/698 |

* cited by examiner

FAST OBJECT FINGERPRINTS

TECHNICAL FIELD

The present disclosure relates to hashing objects and, in particular, to creating an object fingerprint by hashing a plurality of hashes.

BACKGROUND

In storage systems, the entire content of a relatively large object (e.g., a video, data file, picture, document, spreadsheet, etc.) is hashed by a lone device to generate a relatively small hash value. The hash value of the object may then be incorporated into a fingerprint along with additional information about the object (e.g., the size of the original content, etc.) The fingerprint may then be used to uniquely identify the original object for data deduplication purposes.

Unfortunately, the available algorithms used to generate the hash value included in the fingerprint have drawbacks. For example, the faster hash algorithms tend to produce less unique hash values, which have a detrimental impact on the data deduplication process. In contrast, the slower hash algorithms provide more unique or robust hash values, but command a relatively large amount of processing resources to do so.

SUMMARY

An embodiment computing device operating in a data storage system includes an object storage controller operable to divide an object into blocks and to create an object hash from hash values, and a network interface in communication with the object storage controller, the network interface operable to transmit the blocks to a storage subsystem that generates one of the hash values from each of the blocks, to receive the hash values from the storage subsystem, and to provide the hash values to the object storage controller for creation of the object hash from the hash values.

An embodiment computing device operating in a data storage system includes a processor operably coupled to a memory, and an object storage controller stored in the memory that, when executed by the processor, is configured to divide an object into blocks, to request transmission of the blocks to a storage subsystem that generates a hash value from each of the blocks, to receive the hash values from the storage subsystem, and to create an object hash from hash values.

An embodiment computer readable medium containing program instructions for managing a data storage system, wherein execution of the program instructions by one or more processors of the data storage system causes the one or more processors to carry out the steps of dividing an object into blocks, requesting transmission of the blocks to a storage subsystem that generates a hash value from each of the blocks, receiving the hash values from the storage subsystem, and creating an object hash from hash values.

An embodiment method of managing a data storage system includes dividing, by an object storage controller of a computing device in the data storage system, an object into blocks, requesting, by the object storage controller, transmission of the blocks to a storage subsystem that generates a hash value from each of the blocks, receiving, by the object storage controller, the hash values from the storage subsystem, and creating, by the object storage controller, an object hash from hash values.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely a data storage system. The concepts in the disclosure may also apply, however, to other types of systems with other components.

Figure 1:
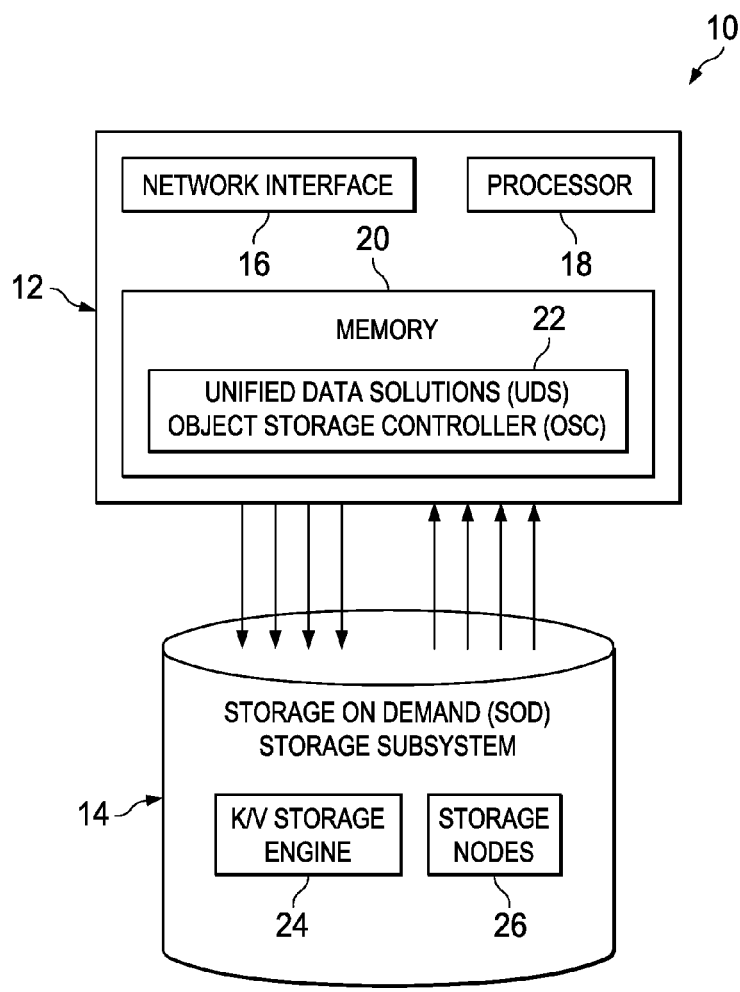
FIG. 1 illustrates an embodiment data storage system including a computing device, which includes an object storage controller, and a storage subsystem.

Referring now to FIG. 1, an embodiment data storage system 10 is illustrated. As will be more fully explained below, the embodiment data storage system 10 offers fast and robust hashing and fingerprint creation, which improves the speed and performance of the deduplication process. The enhanced deduplication process permits the data storage system 10 to have a lower overall cost relative to, for example, conventional data storage systems.

As shown in FIG. 1, the data storage system 10 includes a computing device 12 in communication with a storage subsystem 14. In an embodiment, the computing device 12 is a computer, a blade server, a server, or another computing device. As shown, in an embodiment the computing device 12 includes a network interface 16, a processor 18, a memory 20, and an object storage controller (OCS) 22.

The network interface 16 may comprise wired links, such as an Ethernet cable or the like, and/or wireless links to access nodes or different networks. The network interface 16 allows the processor 18 to communicate with remote systems or units via the networks. For example, the network interface 16 may provide wireless communication via one or more transmitters/transmit antennas and one or more receivers/receive antennas.

The processor 18 is configured to implement the devices and methods disclosed herein. The processor 18 is operatively coupled to, and in communication with, the network interface 16, the memory 20, and the object storage controller 22.

Still referring to FIG. 1, the memory 20 stores the object storage controller 22. The memory 20 may comprise any type of system memory such as static random access memory (SRAM), dynamic random access memory (DRAM), synchronous DRAM (SDRAM), read-only memory (ROM), a combination thereof, or the like. In an embodiment, the memory 20 may include ROM for use at boot-up, and DRAM for program and data storage for use while executing programs. While the memory 20 and the processor 18 are illustrated in one block in FIG. 1, the memory 20 and/or the processor 18 may be formed from several independent memory blocks and processing units in practical applications.

In an embodiment, the object storage controller 22 resides in, or is loaded into, the memory 20. The object storage controller 22 is operable to divide a relatively large object into smaller blocks or segments. As used herein, object refers to content such as a video, a data file, a picture, a document, a spreadsheet, and so on. The object storage controller 22 may divide the object into blocks based on, for example, the resources available, a desired or predetermined number of blocks, and so on.

Once the object has been divided, the object storage controller 22 requests that the blocks be transmitted to the storage subsystem 14. In an embodiment, object storage controller 22 requests that the blocks be transmitted to the storage subsystem 14 using or through the network interface 16, which is represented by the arrows from the computing device 12 to the storage subsystem 14 in FIG. 1.

In an embodiment, the blocks are transmitted sequentially from the computing device 12 to the storage subsystem 14 in parallel. In other words, all of the blocks are transmitted simultaneously. If a sufficient amount of system resources are available, the entirety of the blocks may be transmitted in parallel. In the alternative, groups of the blocks may be transmitted from the computing device 12 to the storage subsystem 14 if available resources to transmit all of the blocks at the same time are lacking.

Once the blocks are received, the storage subsystem 14 generates a hash value from each of the blocks. The storage subsystem 14 may implement a variety of different hashing algorithms to hash the blocks and produce the hash values. In an embodiment, the storage subsystem 14 generates the hash values as part of its block integrity guarantees. In an embodiment, the block integrity guarantees may involve calculating a checksum of the hash values using a checksum or hashing algorithm (e.g., cyclical redundancy check (CRC), message digest five (MD5), secure hash algorithm (SHA1, SHA2), etc.). Because the storage subsystem 14 determines or computes the hash values using the block integrity guarantees, there is no need for a fingerprint algorithm to repeat the costly calculation over the whole object.

Still referring to FIG. 1, the object storage controller 22 is configured to receive the hash values from the storage subsystem 14, which is represented by the arrows from the storage subsystem 14 to computing device 12 in FIG. 1. In an embodiment, the object storage controller 22 concatenates the hash values. In an embodiment, the object storage controller 22 otherwise assembles or collects the set of hash values. In an embodiment, the hash values are at least temporarily stored in the memory 20 of the computing device 12.

Once the hash values have been received, the object storage controller 22 creates an object hash from hash values. In other words, the object storage controller 22 creates a hash of the hash values (i.e., a hash of the hashes). The object hash corresponds to, and preferably uniquely identifies, the object.

In an embodiment, the object hash is incorporated into a fingerprint. For example, the fingerprint may include the object hash, an original size of the object prior to the object being divided, and additional information. The fingerprint corresponds to the object (i.e., the original content) and, as such, may be used as part of a data deduplication process for the data storage system 10. Indeed, the fingerprint for one object is compared to the fingerprint of another object. If the fingerprints match, the objects are duplicates and the data storage system 10 knows that only one copy of the object needs to be stored. On the other hand, if the fingerprints do not match, the objects are not duplicates and the data storage system 10 knows that each of the objects needs to be stored.

Although shown as a single component or module in FIG. 1, the object storage controller 22 may be implemented through several separate and discrete components or modules configured to operate independently in conjunction with the processor 18. In addition, embodiments of the object storage controller 22 or other components in the present disclosure may be implemented using software, hardware, firmware, and combinations thereof.

As shown in FIG. 1, the object storage controller 22 is in communication with the storage subsystem 14. The object storage controller 22 and the storage subsystem 14 may communicate through a wired connection or wirelessly. To facilitate such communication, a switch, router, or other hardware may be employed and interposed between the computing device 12 and the storage subsystem 14. The object storage controller 22 and the storage subsystem 14 may communicate over, for example, a local-area network, a wide-area network, the Internet, or combinations thereof.

Still referring to FIG. 1, in an embodiment the storage subsystem 14 represents a distributed hash table and includes or has access to a key-value storage engine 24 and a plurality of storage nodes 26. The key-value storage engine 24 may use a hash key to determine or identify which of the available storage nodes 26 holds the value corresponding to that key. In an embodiment, each of the storage nodes 26 includes a node processor, a memory (e.g., disk drive, flash drive, optical drive, etc.), and a node network interface configured to communicate with the network interface 16 of the computing device 12. In an embodiment, the memory of each of the storage nodes 26 at least temporarily stored one or more of the hash values. Although the storage nodes 26 are represented by a single block in FIG. 1, it should be recognized that numerous storage nodes 26 (e.g., hundreds, thousands, or more nodes) may be used in conjunction with the data storage system 10.

Figure 2:
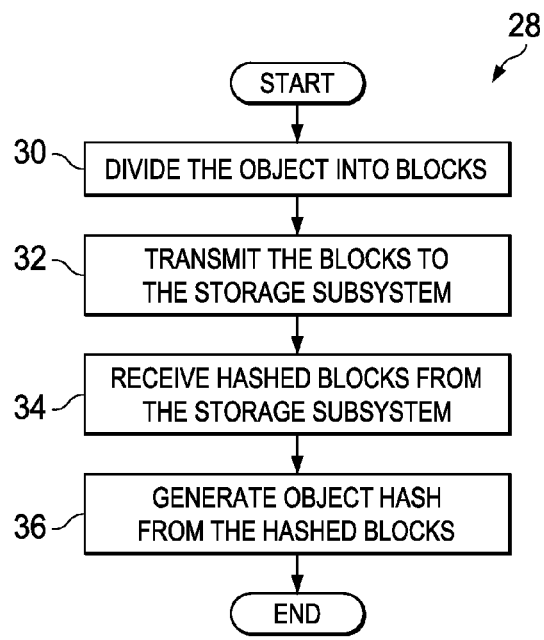
FIG. 2 illustrates a method of managing the data storage system of FIG. 1.

Referring now to FIG. 2, a method 28 of managing the data storage system 10 is illustrated. In block 30, the object storage controller 22 of the computing device 12 in the data storage system 10 divides the object into blocks. In block 32, the object storage controller 22 requests transmission of the blocks to the storage subsystem 14. As noted above, the storage subsystem 14 is able to generate a hash value from each of the blocks.

Still referring to FIG. 2, in block 34 the object storage controller 22 receives the hash values from the storage subsystem 14. Then, in block 36, the object storage controller 22 creates the object hash from the hash values. In an embodiment, the object hash is then incorporated into a fingerprint identifying the content. The object hash and/or fingerprint uniquely identifies the object without requiring a single hashing or fingerprint algorithm being processed on a lone machine or computing device to hash the entire content. In an embodiment, the functionality of the object storage controller 22 or the methods and devices described herein may be incorporated into or saved on a computer readable medium (e.g., a disk, a flash drive, etc.).

From the foregoing, it should be recognized that the data storage system 10 or components thereof provide significant advantages relative to conventional systems or their components. Indeed, the embodiment data storage system 10 offers fast and robust hashing and fingerprint creation, which improves the speed and performance of the deduplication process. For example, if calculating a hash takes 24 milliseconds per megabyte (MB), on a 1 GbE networked server, a 2 GB object will take about a minute of central processing unit (CPU) time and another minute of disk input/output (I/O) time. In contrast, using the data storage system 10 and the methods described herein, the object hash for the same 2 GB object would take about 3 seconds after the IO completes.

In addition to the above, the enhanced deduplication process permits the data storage system 10 to have a lower overall cost. Still further, the reduction in data movement through the networks, disk subsystems, and caches provides a large performance improvement. In other words, the data storage system 10 offers less data cache churn, less data transferred over the input/output (I/O) subsystem, and faster operation. Indeed, the data storage system 10 has eliminated a redundant traversal of the object and the cost of computing a hash (e.g., checksum, digest, string, etc.) of the entire content, resulting in less inline computation and latency.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A computing device comprising:
    a processor; and
    a non-transitory computer readable storage medium storing programming for execution by the processor, the programming including instructions to:
        divide an object into blocks,
        simultaneously transmit, in parallel over a network interface, all of the blocks to a storage subsystem that generates hash values comprising a respective hash value from each of the blocks, wherein the storage subsystem generates, using a plurality of independent storage nodes, the respective hash values from each of the blocks,
        receive the hash values from the storage subsystem, and
        create an object hash from the hash values.

2. The computing device of claim 1, further comprising incorporating the object hash into a fingerprint corresponding to the object, wherein the fingerprint indicates a size of the object.

3. The computing device of claim 1, wherein the storage subsystem generates the hash values as part of a block integrity process.

4. The computing device of claim 1, wherein a first node of the plurality of independent storage nodes, comprises a node processor, a node memory, and a node network interface in communication with the network interface.

5. The computing device of claim 1, wherein the instructions to divide the object into the blocks comprise instructions to divide the object into the blocks in accordance with available resources.

6. The computing device of claim 1, wherein the programming further comprises instructions to concatenate the hash values.

7. A computing device comprising:
    a processor; and
    a non-transitory computer readable storage medium storing programming for execution by the processor, the programming including instructions to:
        divide an object into blocks,
        simultaneously transmit, in parallel over a network interface, the blocks in groups to a storage subsystem that generates hash values comprising a respective hash value from each of the blocks, wherein the storage subsystem generates, using a plurality of independent storage nodes, the respective hash values from each of the blocks,
        receive the hash values from the storage subsystem,
        create an object hash from the hash values, and
        incorporate the object hash into a fingerprint corresponding to the object.

8. The computing device of claim 7, wherein the programming further includes instructions to perform data deduplication.

9. The computing device of claim 7, wherein the instructions to divide the object into the blocks comprise instructions to divide the object into the blocks in accordance with available resources.

10. The computing device of claim 7, wherein the programming further comprises instructions to concatenate the hash values.

11. A computer program product comprising a non-transitory computer readable storage medium storing programming for execution on a processor, the programming including instructions for:
    dividing an object into blocks;
    transmitting, simultaneously in parallel over a network interface, the blocks to a storage subsystem that generates hash values, wherein the hash values comprise a respective hash value from each of the blocks, wherein the storage subsystem generates, using a plurality of independent storage nodes, the respective hash values from each of the blocks;
    receiving the hash values from the storage subsystem; and
    creating an object hash from the hash values.

12. The computer readable medium of claim 11, wherein the programming includes instructions for incorporating the object hash into a fingerprint corresponding to the object.

13. The computer readable medium of claim 11, wherein the instructions for dividing the object into the blocks comprise instructions for dividing the object into the blocks in accordance with available resources.

14. The computer readable medium of claim 11, wherein the programming further comprises instructions for concatenating the hash values.

15. The computer program produce of claim 11, wherein the instructions further comprise instructions for incorporating the object hash into a fingerprint corresponding to the object.

16. A method of managing a data storage system, the method comprising:
    dividing, by an object storage controller of a computing device in the data storage system, an object into blocks;
    transmitting, simultaneously in parallel over a network interface the blocks to a storage subsystem that generates hash values, wherein the hash values comprise a respective hash value from each of the blocks, wherein the storage subsystem generates, using a plurality of independent storage nodes, the respective hash values from each of the blocks;
    receiving, by the object storage controller, the hash values from the storage subsystem; and
    creating, by the object storage controller, an object hash from the hash values.

17. The method of claim 16, wherein dividing the object into the blocks comprises dividing the object into blocks in accordance with available resources.

18. The method of claim 16, further comprising concatenating the hash values.

19. The method of claim 16, further comprising incorporating the object hash into a fingerprint corresponding to the object.

20. The method of claim 19, further comprising performing data deduplication.

* * * * *